(12) United States Patent
Sherry et al.

(10) Patent No.: US 6,268,820 B1
(45) Date of Patent: Jul. 31, 2001

(54) ANALOG-TO-DIGITAL CONVERSION SYSTEM

(75) Inventors: Adrian Sherry, Dublin; Damien McCartney, Limerick, both of (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/566,245

(22) Filed: May 5, 2000

(51) Int. Cl.[7] .................................................. H03M 1/12
(52) U.S. Cl. ........................... 341/155; 341/139; 341/156
(58) Field of Search ..................................... 341/155, 141, 341/143, 131, 139, 118, 110, 156, 114, 115, 116, 159; 708/552; 348/572

(56) References Cited

U.S. PATENT DOCUMENTS

| | | | |
|---|---|---|---|
| 5,422,643 | * 6/1995 | Chu et al. | 341/141 |
| 5,777,569 | * 7/1998 | Naruki et al. | 341/155 |
| 6,057,891 | * 5/2000 | Gue'rin et al. | 348/572 |
| 6,104,329 | * 8/2000 | Kawano | 341/139 |
| 6,112,220 | * 8/2000 | Smith | 708/552 |
| 6,154,161 | * 11/2000 | Leme et al. | 341/143 |

* cited by examiner

Primary Examiner—Brian Young
Assistant Examiner—John Nguyen
(74) Attorney, Agent, or Firm—Samuels, Gauthier & Stevens, LLP

(57) ABSTRACT

An analog to digital conversion system having a plurality of analog to digital converters (ADCs). Each one of such ADCs is configured to convert a corresponding one of a plurality of analog signals into a corresponding sequence of digital words. The ADCs have different degrees of conversion performance. A source of the pulses is included. Each one of the ADCs is configured to provide a corresponding one of the sequences of digital words in response to the pulses. Each one of the digital words in each of the sequences is provided at substantially the same time. A controller is provided for interrupting and/or changing the configuration of one or more of the ADCs. The controller provides the interrupt and/or change in configuration with a priority to one of the ADCs over the other one of the ADCs.

21 Claims, 10 Drawing Sheets

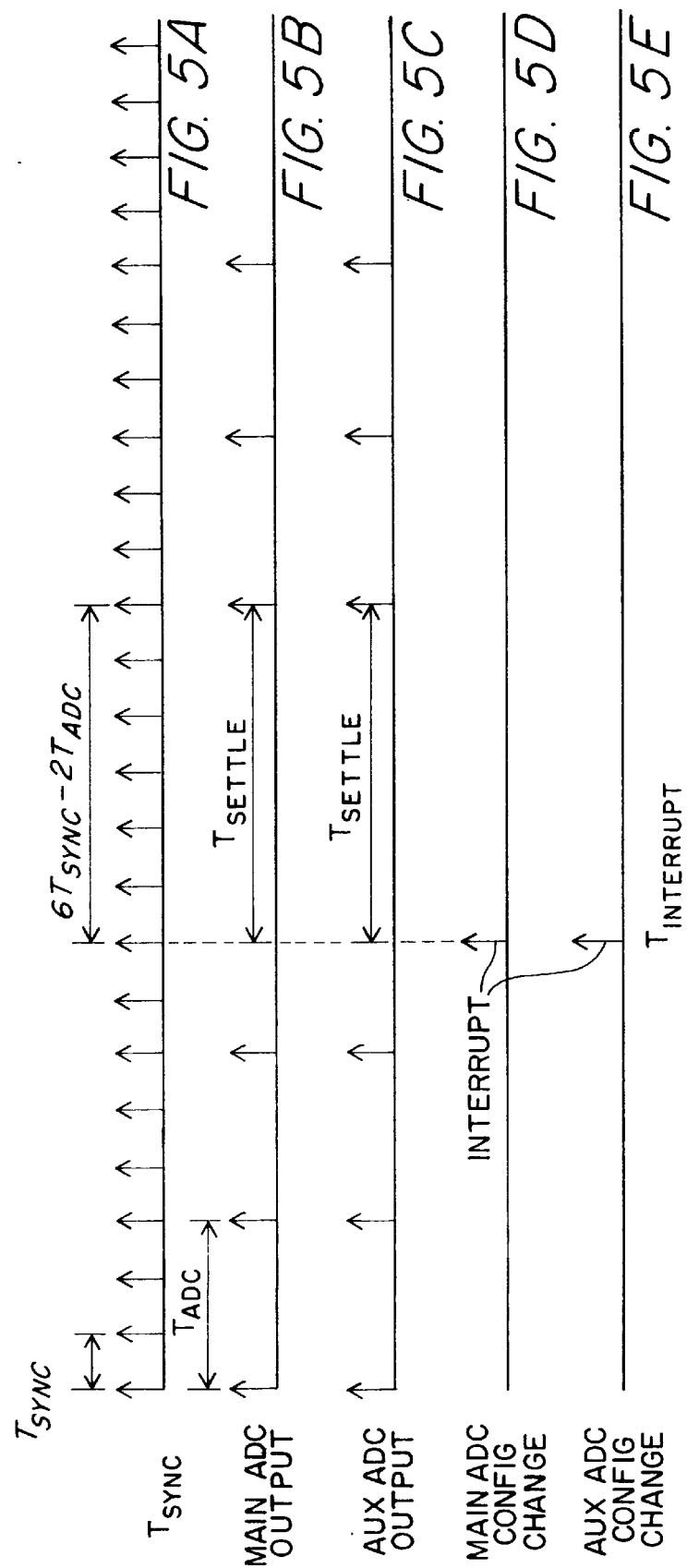

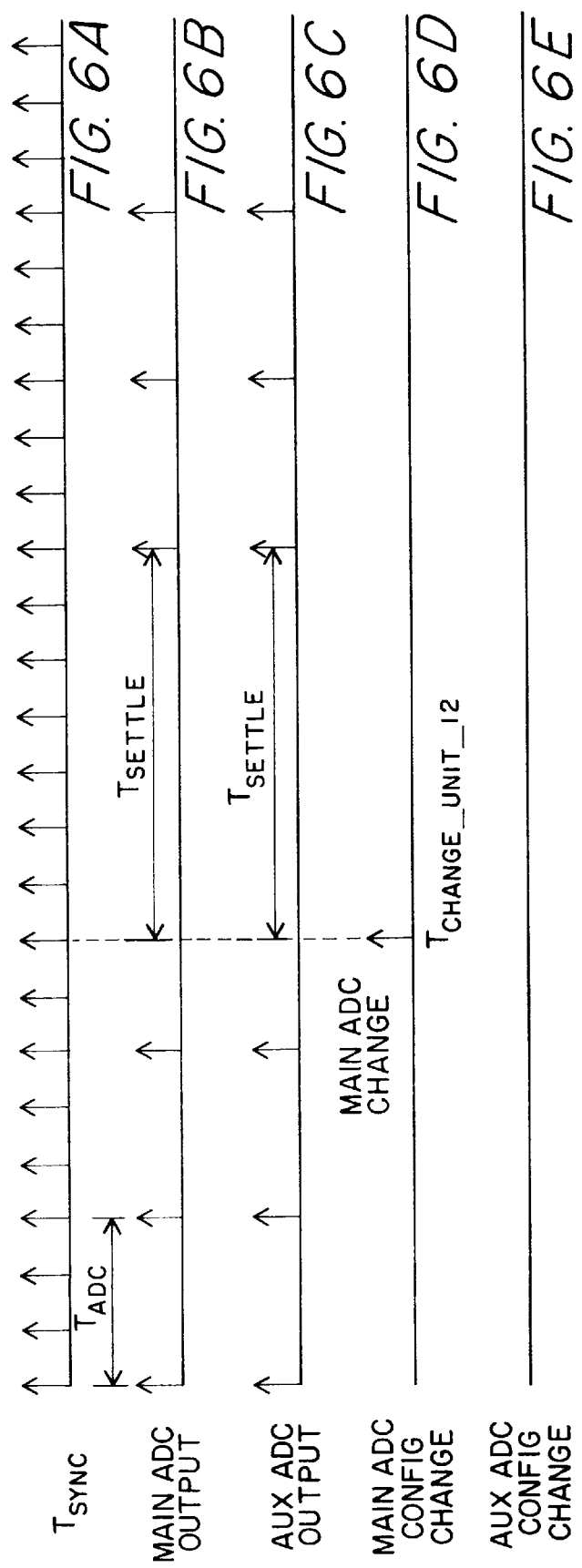

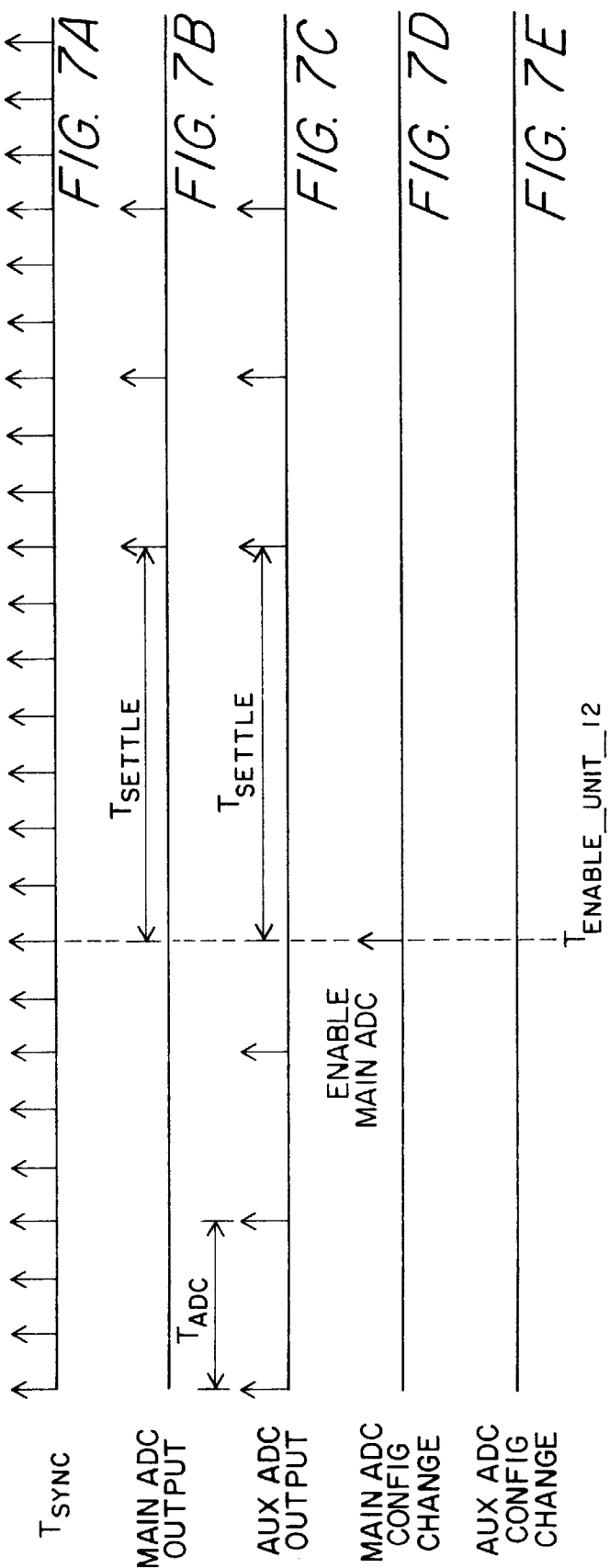

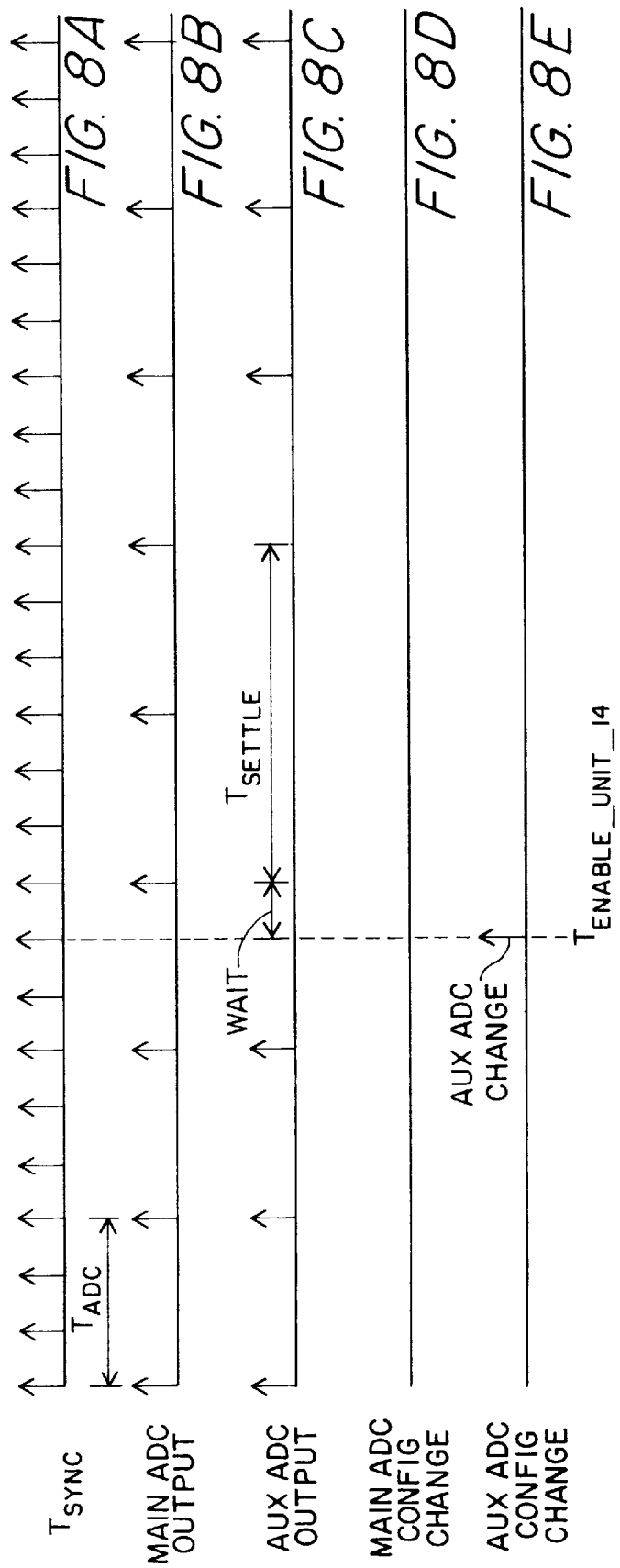

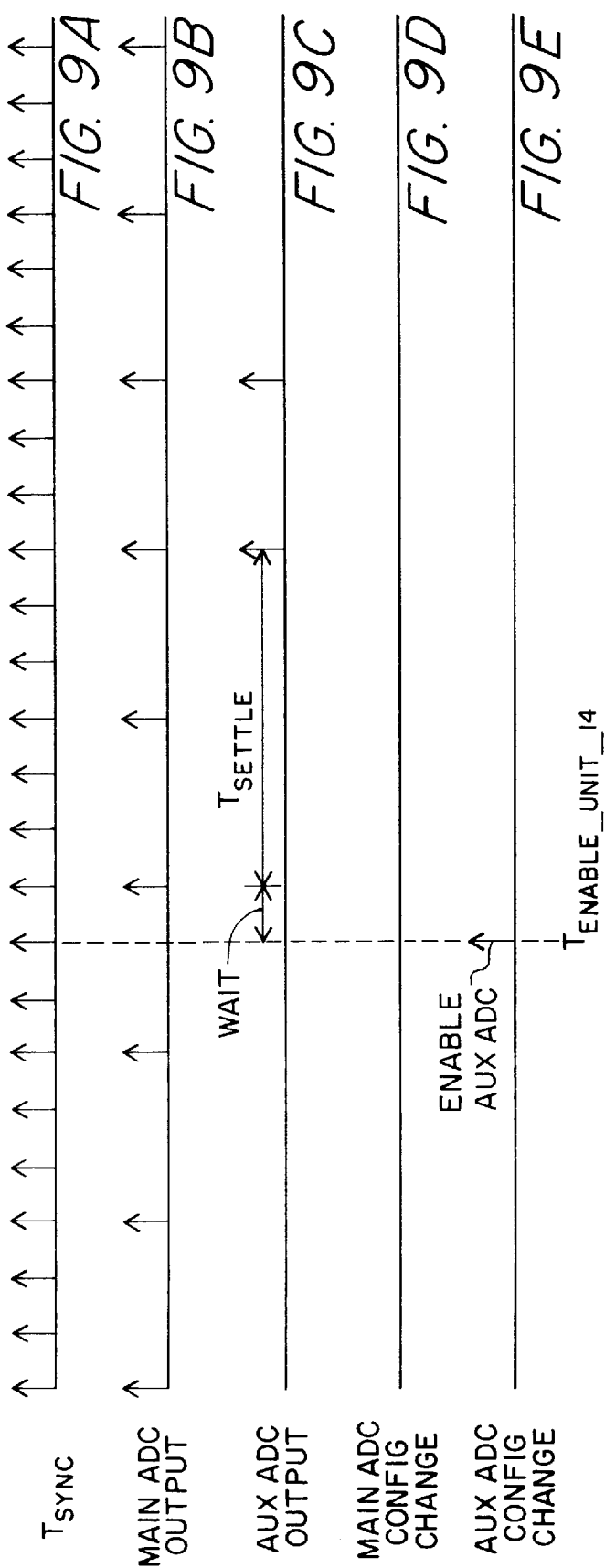

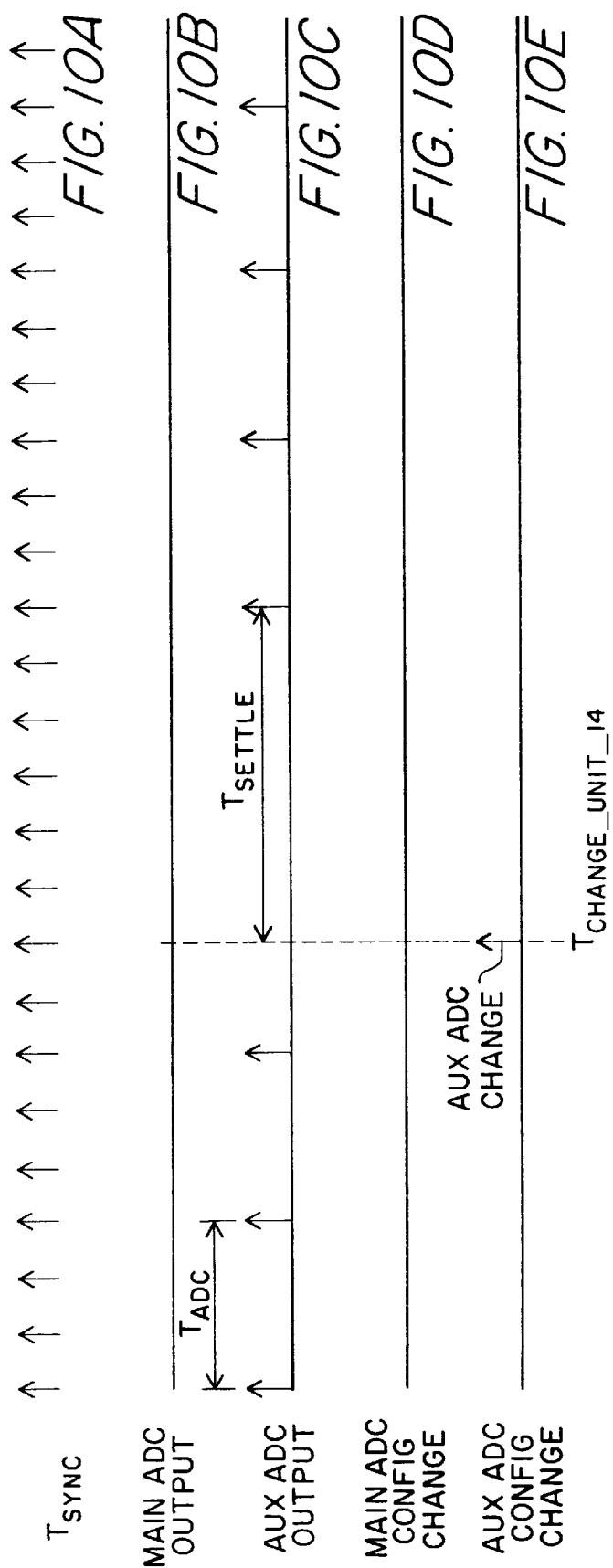

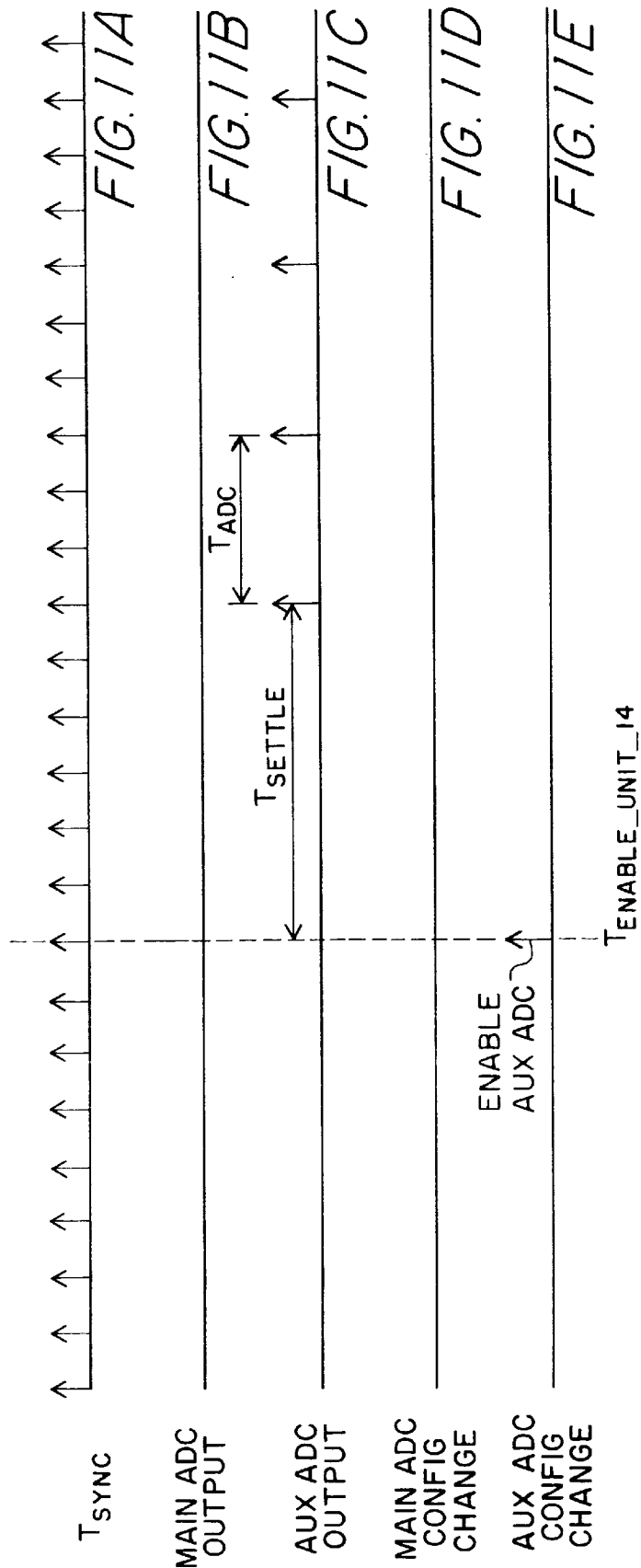

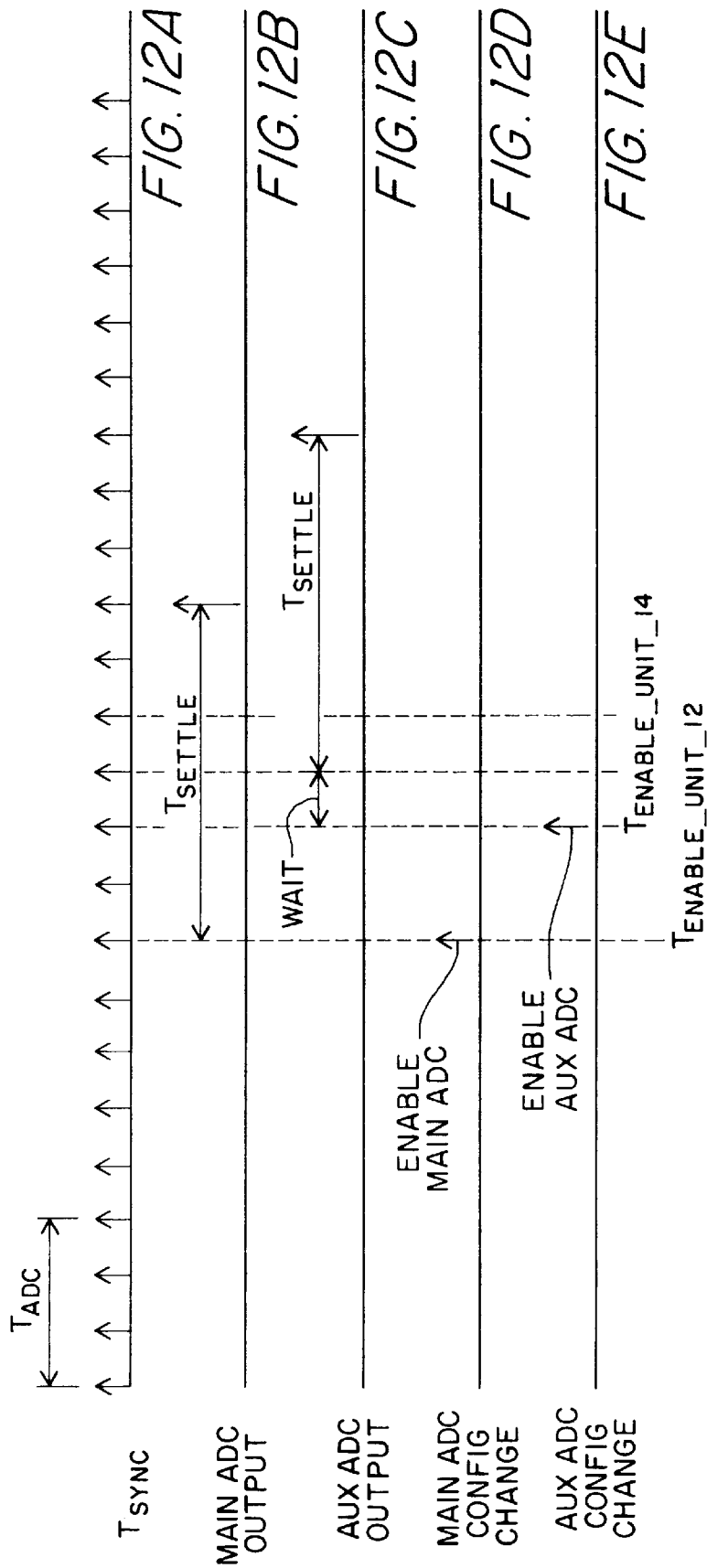

ANALOG-TO-DIGITAL CONVERSION SYSTEM

BACKGROUND OF THE INVENTION

This invention relates generally to analog-to-digital conversion systems and more particularly to analog-to-digital conversion systems adapted to convert a plurality of analog signals into corresponding digital signals, or words.

As is known in the art, analog-to-digital (ADCs) have a wide range of applications. In some applications, it is required that more than one analog signal be converted into a corresponding digital signal. One arrangement is shown in FIG. 1. In such an arrangement, the analog signals, here N analog signals, are fed to the input of a multiplexer (MUX). A control, or select, signal is fed to the multiplexer and the multiplexer couples one of the plurality of analog signals to an analog-to-digital converter (ADC) selectively in accordance with the control signal. The ADC produces a new conversion result at an update rate, or conversion period of $T_{ADC}$ seconds. However, after the multiplexer, in response to the control signal, changes from one input signal to another input signal, a number of conversion periods may be required before a valid, settled ADC result is produced, i.e., $T_{SETTLE} \geq T_{ADC}$, as indicated in FIG. 2.

A particular example of this is with a sigma-delta ADC featuring a second order sigma-delta modulator plus a third-order ($sinc^3$) decimation filter. This particular ADC will not produce a valid result until a time period of $T_{SETTLE}=3*T_{ADC}$ has elapsed because it takes the $sinc^3$ filter 3 outputs update periods to settle (i.e., $T_{SETTLE}=3*T_{SINC3}$. In the case where this ADC is chopped, as described in U.S. Pat. No. 5,675,334, $T_{SETTLE}=2*T_{ADC}$. Thus, for a chopped ADC, $T_{ADC}=3*T_{SINC3}$, so that $T_{SETTLE}=6*T_{SINC3}$. If two independent inputs are to be converted with this chopped ADC, the time required will therefore be equal to $2*T_{SETTLE}$, i.e., $4*T_{ADC}$.

Another approach for converting more than one input analog signal is to use a separate ADC for each analog signal. For example, one such an arrangement is shown in FIG. 3 for two analog signals. Both ADCs convert simultaneously. Both ADCs are identical and are therefore capable of the same performance. That is, in the analog-to-digital conversion process, noise internal to the converter is generated. For example, with a switched capacitor sigma delta ADC, there is thermal noise generated. One way to increase the ADC's performance, more particularly, increase the resolution of the input signal in the presence of this thermally generated internal noise, is to increase the size of the capacitors used in the switching networks of the ADC. Increasing the size of the capacitors, however, increases the power required by the ADC and also increases the chip area required for the ADC. Another way to increase performance, here again by increasing the resolution of the input signal in the presence of this thermally generated internal noise is to increase the gain provided to the analog input signal. This, however, also requires an increase in the power required for the ADC. Thus, as the performance of an ADC is increased, the power and chip area required for the ADC generally increases. A third way to increase performance is to include a high impedance buffer for the ADC to reduce the loading effect of the ADC on the analog signal source. A fourth way the performance of an ADC may be improved is to increase the conversion rate of the ADC.

Thus, an increase in performance may be achieved by: increasing the resolution of the input signal in the presence of thermally generated noise and/or providing a high input impedance to the ADC and/or increasing the conversion rate of the ADC and/or increasing the gain of the ADC. Thus, if a first ADC has, relative to a second ADC, a higher resolution of the input signal in the presence of thermally generated noise and/or a higher input impedance to the ADC and/or a higher conversion rate and/or higher gain, the first ADC has, as defined herein, a higher degree of performance than the second ADC.

SUMMARY

In accordance with the present invention, an analog to digital conversion system is provided having a plurality of analog to digital converters. Each one of such converters is configured to convert a corresponding one of a plurality of analog signals into a corresponding digital signal in response to pulses fed to such one of the converters. The converters perform such conversion with different degrees of conversion performance.

In one embodiment of the invention, the ADCs perform such conversion with different input signal to internal noise resolutions.

In another embodiment of the invention, the ADCs perform such conversion with different conversion rates.

In yet another embodiment of the invention, the ADCs have different input impedances.

In still yet another embodiment of the invention, the ADCs have different gains.

In accordance with another feature of the invention a controller is provided for interrupting and/or changing the configuration of one or more of the ADCs. The controller provides the interrupt and/or change in configuration with a priority to one of the ADCs over the other one of the ADCs.

With such an arrangement, a relatively higher throughput for a given power dissipation is achieved compared with a multiplexed ADC. Further, the invention allows for lower power in a main/auxiliary signal scenario compared to a system, which uses two identical ADCs. Thus, in applications which require converting a main (i.e., primary) input signal and a secondary signal, as for example in a thermocouple temperature transducer that requires an auxiliary measurement of a "cold junction", the auxiliary input signal is processed with the main input signal to compensate the main measurement for influence of the auxiliary input. In such application, the auxiliary input typically may not need to be calculated as often as the main input signal, and does not need to be measured as accurately.

In accordance with the invention, an analog to digital conversion system is provided having a plurality of analog to digital converters (ADCs). Each one of such ADCs is configured to convert a corresponding one of a plurality of analog signals into a corresponding sequence of digital words. The ADCs perform such conversion with different degrees of performance. A source of the pulses is included. Each one of the ADCs is configured to provide a corresponding one of the sequences of digital words in response to the pulses. Each one of the digital words in each of the sequences is provided at substantially the same time.

In accordance with still another feature of the invention, a analog to digital conversion system is provided comprising: a plurality of analog to digital converters, each one of such converters being configured to convert a corresponding one of a plurality of analog signals into a corresponding digital signal in response to pulses fed to such one of the converters, such converters performing such conversion with different degrees of conversion performances; and, a common source of the pulses for enabling the plurality of converter ADCs to convert the analog signals fed thereto synchronously.

In accordance with another feature of the invention, an analog to digital conversion system is provided comprising: a plurality of analog to digital converters, each one of such converters being configured to convert a corresponding one of a plurality of analog signals into a corresponding digital signal in response to pulses fed to such one of the converters, a first one of such converters performing such conversion with higher degree of conversion performance than a second one of the converters; and wherein the second one of the converts consumes less power than the first one of the converters.

In accordance with still another feature of the invention, an analog to digital conversion system is provided comprising: an integrated circuit chip having formed thereon: a plurality of analog to digital converters, each one of such converters being configured to convert a corresponding one of a plurality of analog signals into a corresponding digital signal in response to pulses fed to such one of the converters, a first one of such converters having a higher degree of performance than a second one of such converters and; wherein the second one of the converters occupies less area on the chip than the first one of the converters.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A–5E are timing diagrams showing an example of the priority criteria used by the ADC system of FIG. 4, here illustrating the effect of an interrupt in the conversion of the pair of ADC of the ADC system of FIG. 4;

FIGS. 6A–6E are timing diagrams showing an example of the priority criteria used by the ADC system of FIG. 4, here illustrating the effect of a change in the configuration of the main ADC of the ADC system of FIG. 4 while the auxiliary ADC was enabled;

FIGS. 7A–7E are timing diagrams showing an example of the priority criteria used by the ADC system of FIG. 4, here illustrating the effect of enabling the main ADC of the ADC system of FIG. 4 during a period of time the auxiliary ADC was enabled;

FIGS. 8A–8E are timing diagrams showing an example of the priority criteria used by the ADC system of FIG. 4, here illustrating the effect of a change in the configuration of the auxiliary ADC during a period of time the main ADC was enabled;

FIGS. 9A–9E are timing diagrams showing an example of the priority criteria used by the ADC system of FIG. 4, here illustrating the enabling the auxiliary ADC during a period of time the main ADC was enabled;

FIGS. 10A–10E are timing diagrams showing an example of the priority criteria used by the ADC system of FIG. 4, here illustrating a change in the configuration of the auxiliary ADC during a period of time the main ADC was disabled;

FIGS. 11A–11E are timing diagrams showing an example of the priority criteria used by the ADC system of FIG. 4, here illustrating the enabling the auxiliary ADC during a period of time the main ADC was disabled; and FIGS. 12A–12E are timing diagrams showing an example of the priority criteria used by the ADC system of FIG. 4, here illustrating enabling the main ADC for a single conversion followed by enabling the auxiliary ADC during a period of time after the main ADC was enabled but before the main ADC has produced the converted digital word.

Like reference symbols in the various drawings indicate like elements.

DETAILED DESCRIPTION

Figure 1:
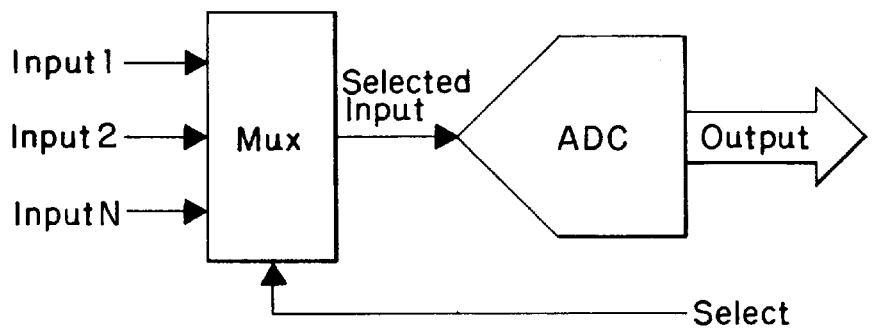
FIG. 1 is a diagram of an analog-to-digital (ADC) adapted to convert one of a plurality of analog input signals selectively in accordance with a select signal in accordance with the PRIOR ART.
Figure 2:
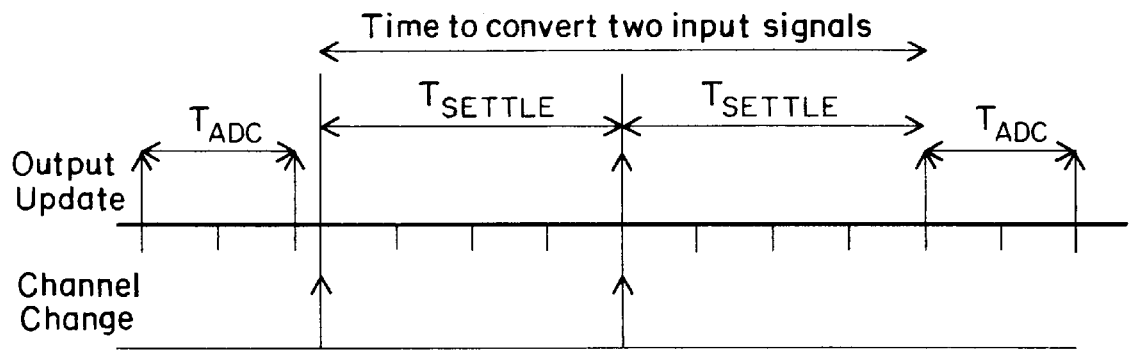
FIG. 2 is a timing diagram of the ADC of FIG. 1 illustrating the effect of settling time in converting two of the analog input signals.
Figure 3:
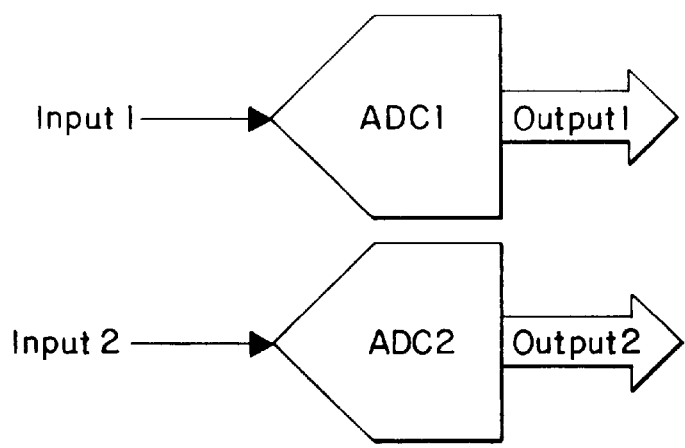
FIG. 3 is another ADC system according to the PRIOR ART adapted to convert a pair of analog input signals.
Figure 4:
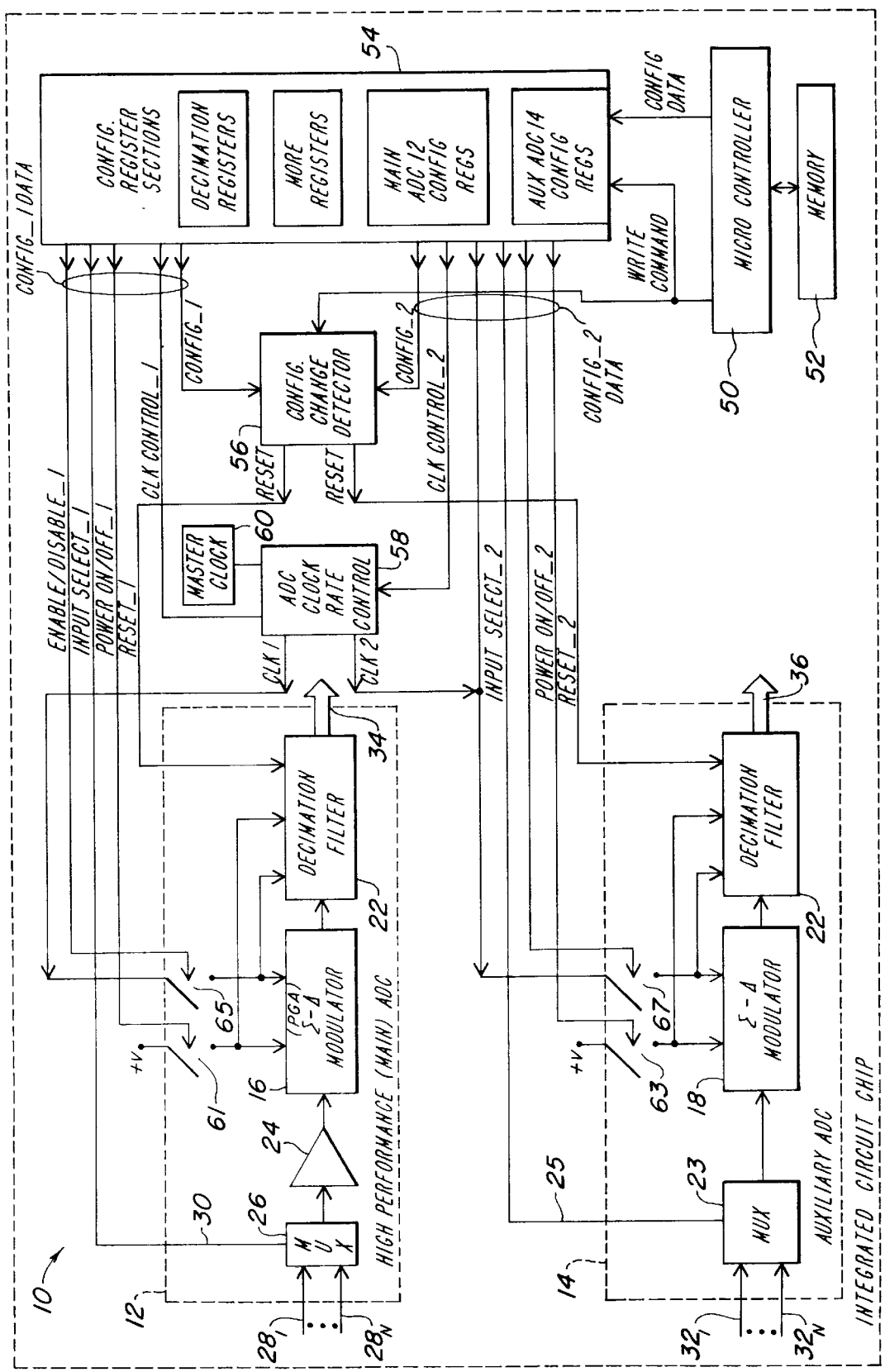
FIG. 4 is an analog-to-digital conversion system according to the invention, such system having a high performance, main ADC and a lower performance auxiliary ADC.

Referring now to FIG. 4, an analog-to-digital conversion system 10 is shown to include a plurality of, here two, analog-to-digital converters (ADCs) 12, 14. Both ADCs 12, 14 are here chopped, switched capacitor, sigma-delta ADCs such as described in U.S. Pat. No. 5,675,334 "Analog to Digital Conversion system", inventor Damien McCartney, issued Oct. 7, 1997, assigned to the same assignee as the present invention. Thus, each one of the ADCs 12, 14 includes a sigma-delta modulator 16, 18, respectively, and a decimation filter 20, 22, respectively. Here, however, the ADC 12 has a high degree of performance compared to the degree of performance of ADC 14. Thus because of its lower degree of performance, ADC 14 is used as an auxiliary ADC. Thus, the high performance ADC 12 may be considered as a main ADC 12.

More particularly, main ADC 12 can have a higher degree of performance because it has larger capacitors in the switching network thereof compared to the capacitors used in the switching network of auxiliary ADC 14, and/or have the same size capacitors but operates at a higher conversion rate compared to the auxiliary ADC 14, and/or have a higher input impedance than that of the auxiliary ADC 14 and/or higher gain than ADC 14. Here, the ADC 12 is coupled to the analog input signal source through a buffer 24, it being noted that such buffer is not included in the auxiliary ADC 14. Further, here the main ADC 12 has a higher gain than the auxiliary ADC 14. Thus, the internally generated thermal noise in main ADC 12 is less than that in auxiliary ADC 14. This thereby increases the input signal to internally generated noise resolution of the main ADC 12 compared to auxiliary ADC 14 Further, main ADC 12 includes as the sigma delta modulator 16 thereof a programmable gain/attenuator (PGA) modulator as described in U.S. Pat. No. 5,134,410 entitled "Delta Sigma Modulator having Programmable Gain/Attenuation" inventors Damien McCartney and David Welland, issued Jul. 28, 1992, assigned to the same assignee as the present invention. Here the modulator 16 is programmed to provide additional gain to the analog input signal fed to it thereby further increasing the input signal to internal noise resolution of the main ADC 12 compared to the auxiliary ADC 14. Still further, the main ADC 12 includes, as noted above, the high input buffer amplifier 24 (here, having a gain of unity), which enables the main ADC 12 to be used with high output impedance analog input signal sources. It is noted that in order to further reduce the power required for the auxiliary ADC 14, such ADC 14 does not include such a high input impedance buffer amplifier 24. Finally, the high performance main ADC 12 includes an input multiplexer 26. The input multiplexer 26 is fed by a plurality of, here N, analog input signals on lines $28_1$–$28_N$, respectively. One of the plurality of analog input signal on lines $28_1$–$28_N$ is coupled to the output of the multiplexer 26 selectively in accordance with the control signal on INPUT SELECT_line 30. It is noted that here the auxiliary ADC 14 also includes a multiplexer 23 fed by a plurality of, here M, analog input analog signals on line $32_1$–$32_M$. One of the plurality of analog input signal on lines $32_1$–$32_M$ is coupled to the output of the multiplexer 23 selectively in accordance with the control signal on INPUT SELECT_2 line 25.

As will be described in more detail below, the analog-to-digital conversion system 10, as noted above, includes the plurality of, here two, ADCs 12, 14. Each one of such ADCs 12, 14 is configured to convert a corresponding one of a plurality of analog input signals (i.e., one of the signals on lines $28_1$–$28_N$ and one of the signals on lines $32_1$–$32_M$, respectively) into a corresponding sequence of digital words on output buses 34, 36, respectively, with each one of the digital words in each of the sequences is provided at substantially the same time. As noted above, the ADCs 12, 14 are configured to perform such conversion with different input signal to internal noise resolutions (i.e., the input signal to internal noise resolutions of main ADC 12 being higher than the input signal to internal noise resolutions of the auxiliary ADC 14.

More particularly, the system 10 includes a microcontroller 50 coupled to a memory 52. The microcontroller 50 provides a write command (i.e., WRITE COMMAND) and configuration data (i.e., CONFIG DATA) to a section 54 of registers and to also provides the write command to a configuration change detector 56. The configuration detector 56 will be described below. Suffice it to say here however that the present configuration of the main and auxiliary ADCs 12, 14 are stored in one of the configuration registers in section 54 after an initialization configuration data is fed to such registers via the CONFIG DATA bus of microcontroller 50. If, during operation of the system 10 the microcontroller 50 issues a WRITE COMMAND with a new configuration for main ADC 12, for example, such new configuration is written into one of the registers, to be described, in section 54 and the change in configuration is detected by the configuration change detector 56. In response to such detected configuration change, the configuration change detector 56 issues a RESET_1 signal to the PGA sigma delta modulator 16 and the decimation filter 20 of main ADC 12. The process of resetting the ADC is described in the above-referenced U.S. Pat. No. 5,675,334. In like manner, if, during operation of the system 10 the microcontroller 50 issues a WRITE COMMAND with a new configuration for auxiliary ADC 12, for example, such new configuration is written into one of the registers, to be described, in section 54 and the change in configuration is detected by the configuration change detector 56. In response to such detected configuration change, the configuration change detector 56 issues a RESET_2 signal to the sigma delta modulator 18 and the decimation filter 22 of auxiliary ADC 14.

As will be described below clock pulses to the high performance, main ADC 12 are provided by a clock rate controller 58 on bus CLK_1 and clock pulses to the auxiliary ADC 14 are provide by the clock rate controller on bus CLK_2. The clock pulses on CLK1 and CLK2 are synchronized with each other because both are derived from a common master clock 60.

More particularly, the configuration register section 54 includes a plurality of registers, some of which are:

DECIMATION REGISTERS for storing the amount of decimation to be perform in the decimation filters 20, 22, respectively;

MODE REGISTERS for storing data indicating the operating modes of the ADCs 12, 14 including a converting mode, a calibration mode, a power-down mode, etc.;

A set of MAIN ADC 12 CONFIGURATION REGISTERS for storing data indicating: PGA gain of the main ADC 12, the multiplexer 26 control signal on bus 30, decimation filter 20 scaling parameters which effect the digital representation of the digital words produced by the main ADC 12 on bus 34;

A set of AUXILIARY ADC 14 CONFIGURATION REGISTERS for storing data indicating: the multiplexer 23 control signal on bus 25, and decimation filter 22 scaling parameters which effect the digital representation of the digital words produced by auxiliary ADC 14 on bus 36.

When the microcontroller 50 writes data to the registers in section 54 there can be two effects on system 10. Firstly, it can interrupt one or both of the main and auxiliary ADCs 12, 14 by asserting a reset signal to such ADC or ADCs 12, 14 for a period of time determined by the priority criteria to be described in more detail below, and secondly the data can change the set-up (i.e., configuration) of one or both of the ADCs 12, 14 (e.g., select a new analog input signal via multiplexers 26 and/or 23).

The following are some examples of rules that effects the state of the main and auxiliary ADCs 12, 14 and how such ADCs are interrupted:

(1) If the operating mode is changed to a power-own mode, the configuration section 54 asserts a reset signal on lines RESET_1, RESET_2 to both the main and auxiliary ADCs 12 and 14, respectively, and power off signals are sent on the POWER ON/OFF_1 and POWER ON/OFF_2 lines to open switches 61 and 63, respectively, to thereby remove power (+V) from the ADCs 12 and 14, respectively, and to open switches 65, 67 in response to signals on the ENABLE/DISABLE_1, ENABLE/DISABLE lines respectively, so that the clock pulses provided by the ADC clock rate controller 58 are interrupted in response to an interrupt signal on the CLK_1, CKL_2 busses, respectively;

(2) If the main ADC 12 is to be disabled, the configuration section 54 asserts a reset signal on line RESET_1 to the main ADC 12, and a power off signal is sent on the POWER ON/OFF_1 line to open switch 61 to thereby remove power (+V) from the ADC 12 and to open switch 65 in response to signals on the ENABLE/DISABLE_1 line so that the clock pulses provided by the ADC clock rate controller 58 are interrupted in response to an interrupt signal on the CLK_1 buss, respectively (3) If the auxiliary ADC 14 is to be disabled, the configuration section 54 asserts a reset signal on line RESET_2 to the auxiliary ADC 14, and a power off signal is sent on the POWER ON/OFF_2 line to open switch 63 to thereby remove power (+V) from the ADC 14 and to open switch 67 in response to signals on the ENABLE/DISABLE_2 line so that the clock pulses provided by the ADC clock rate controller 58 are interrupted in response to an interrupt signal on the CLK_2 buss.

(4) If a WRITE COMMAND is sent to the MODE REGISTERS, described above, requesting a change of operating mode (e.g., from converting an analog input signal to performing an internal calibration), each enabled ADC 12, 14 is interrupted by pulsing their respective RESET lines RESET_1, RESET_2, respectively. The ADCs 12, 14 will re-start in the new operating mode immediately because the reset pulse is a relatively short time duration.

(5) If a WRITE COMMAND is sent to the MAIN ADC 12 CONFIGURATION REGISTERS described above, and assuming in this example that the main ADC 12 is enabled, an interrupt pulse is sent to the main ADC 12 via RESET_1 line. In such case, if the auxiliary ADC 14 is also enabled, then it's RESET_2 line should also be pulsed. The ADCs 12 and 14 will re-start immediately because the reset pulse is of relatively short time duration;

(6) If a WRITE COMMAND is sent to the AUXILIARY ADC 14 CONFIGURATION REGISTERS, and assuming the auxiliary ADC 14 is enabled, the auxiliary ADC 14 is interrupted by a pulsing its RESET_2 line. If the main ADC 12 is also enabled, then the RESET_2 line to the auxiliary ADC 14 is not released until the main ADC 12 has started a new conversion cycle. If the main ADC 12 is not enabled, then the auxiliary ADC 14 can re-start immediately after only a short reset pulse.

With regard to a change in configuration, when the configuration of one or both of the ADCs 12, 14 is changed by a request from the microcontroller 50, the configuration change detector 56 monitors this request and issues reset signals as appropriate to the main ADC 12 or the auxiliary ADC 14 via RESET_1 or RESET_2 lines, respectively. The detector 56 operates by detecting the WRITE COMMAND signal provided by the microcontroller 50 and then checking to determine whether there is any change in the configuration data (i.e., the data on config_0 bus from the MAIN ADC 12 CONFIGURATION REGISTERS in section 54 or the data on the config_1 bus from the AUXILIARY ADC 14 CONFIGURATION REGISTERS in section 54). If the configuration data has been changed, the system 10 operates in accordance with the set of priority rules, to be described in connection with FIGS. 5A–5E through 12A–12E) that determines which ADC 12, 14 needs to be interrupted. These rules state that if the change in configuration affects only the auxiliary ADC 14, then only the auxiliary ADC 14 is interrupted. However, a change in the configuration of the main ADC 12 causes an interrupt in both the main ADC 12 and the auxiliary ADC 14. As noted above, the ADCs 12, 14 are interrupted by asserting a pulse on the RESET_1 and RESET_2 lines, respectively, which resets the state of that ADC 12, 14, respectively, so that it may start a new conversion from scratch. If the auxiliary ADC 14 is interrupted while the main ADC 12 is converting, the auxiliary ADC 14 will not re-start until it can re-synchronize itself with the main ADC 12, as will be illustrated below.

Here, the entire digital conversion system 10 is formed on integrated circuit chip 11 (FIG. 4). It should be noted however that the microcontroller 50 and memory 52 need not be in the chip 11 but may be on a different chip. It should also be noted that ADC 14 occupies less area on the chip 11 than the ADC 14 and that ADC 14 consumes less power than ADC 12.

Referring now to FIGS. 5A–5E through 12A–12E, FIGS. 5A–5E show timing diagrams illustrating one of the priority rules referred to above. FIG. 5A shows pulses fed to the decimation filters 20, 22. It is noted that the period of time between successive pulses is $T_{SYNC}$. FIG. 5B shows each time a digital word is produced by the main ADC 12. FIG. 5C shows each time a digital word is produced by the auxiliary ADC 14. It is first noted hat when both ADCs 12, 14 are enabled ADCs 12 and 14 produce digital word at time same time (i.e., the main ADC 12 and the auxiliary ADC 14 are synchronized with each other). Further, here the ADCs 12 and 14 are chopped ADCs as mentioned above and here each ADC 12, 14 requires 2 $T_{SYNC}$ periods in order to produce a new digital word. Finally it should be noted that here there is a $2T_{ADC}$ period settling time required after an interrupt or configuration change in either ADC 12 or ADC 14. It is noted that in this example (i.e., FIGS. 5A–5E) an interrupt at time $T_{INTERRUPT}$, here two $T_{SYNC}$ periods from the last prior time digital words were produced by the ADCs 12, 14. In response to the interrupt at time $T_{INTERRUPT}$, both ADCs 12, 14 are fed a reset pulse so that the digital words which would, absent the interrupt, be produced at the end of the next $T_{SYNC}$ period, are not produced. It is noted that after the interrupt it takes a period of time $T_{SETTLE}$, here equal to $6T_{SYNC}=2T_{ADC}$, before new sequences a digital words are produced at substantially the same times (i.e., synchronously) for both ADCs 12, 14. It should be noted that the interrupt need not take place at the time $T_{SYNC}$, but more typically is asynchronous with $T_{SYNC}$.

Referring now to FIGS. 6A–6E, in this example, both ADCs 12, 14 are initially operating in a particular configuration when, at time $T_{CHANGE\_ADC\_12}$, the configuration of ADC 12 is changed. Because it takes $6T_{SYNC}$ periods after $T_{CHANGE\_ADC\_12}$ in order for the ADC 12 to settle and because the priority criteria requires that both the main ADC 12 and the auxiliary ADC 14 produce digital words at the substantially same time (i.e., synchronously), the auxiliary 14 takes 6 $T_{SYNC}$ periods to settle before it can produce a new digital word after $T_{CHANGE\_ADC\_12}$, as shown in FIGS. 6A–6E.

Referring now to FIGS. 7A–7E, in this example, ADC is initially operating in a particular configuration when, at time $T_{ENABLE\_ADC\_12}$, the main ADC 12 is to be enabled. Because it takes $6T_{SYNC}$ periods after $T_{CHANGE\_ADC\_14}$ in order for the main ADC 12 to settle, and because the priority criteria requires that both the main ADC 12 and the auxiliary ADC 14 produce digital words at the substantially same time (i.e., synchronously), the auxiliary ADC 14 takes $6T_{SYNC}$ periods to settle, as shown in FIGS. 7A–7E.

Referring now to FIGS. 8A–8E, in this example, both ADCs 12 and 14 are initially operating in a particular configuration when, at time $T_{CHANGE\_ADC\_14}$, the configuration of auxiliary ADC 14 is to change. Because it takes $6T_{SYNC}$ periods after $T_{CHANGE\_ADC\_14}$ in order for the auxiliary ADC 14 to settle, and because the priority criteria requires that both the main ADC 12 and the auxiliary ADC 14 produce digital words at substantially the same time (i.e., synchronously), the auxiliary ADC 14 must wait additional time so that it will produce its next digital word only when the main ADC 12 is to produce its digital word. Thus, in this example in FIGS. 8A–8E, $T_{CHANGE\_ADC\_14}$ was produced one $T_{SYNC}$ period before ADC 12 was to produce a digital word. Thus, in this example, the auxiliary ADC 14 must wait until the next main ADC 12 output is produced. It is noted that it takes $6T_{SYNC}$ periods after the wait before the auxiliary ADC 14 produces its first digital word, as shown in FIGS. 8A–8E.

Referring now to FIGS. 9A–9E, in this example, only the main ADC 12 is initially operating in a particular configuration when, at time $T_{ENABLE\_ADC\_14}$, auxiliary ADC 14 is to be enabled. Because it takes $6T_{SYNC}$ periods after $T_{ENABLE\_ADC\_14}$ in order for the auxiliary ADC 14 to settle, and because the priority criteria requires that both the main ADC 12 and the auxiliary ADC 14 produce digital words at substantially the same time (i.e., synchronously), the auxiliary ADC 14 must wait additional time so that it will produce its next digital word only when the main ADC 12 is to produce its digital word. Thus, in this example, the auxiliary ADC 14 must wait until the next main ADC 12 output is produced. It is noted that it takes $6T_{SYNC}$ periods after the wait before the auxiliary ADC 14 produces its first digital word, as shown in FIGS. 9A–9E.

Referring now to FIGS. 10A–10E, in this example, only the auxiliary ADC 14 is initially operating in a particular configuration when, at time $T_{CHANGE\_ADC\_14}$, the configuration of auxiliary ADC 14 is to change. Because it takes $6T_{SYNC}$ periods after $T_{CHANGE\_ADC\_14}$ in order for the auxiliary ADC 14 to settle, and because the priority criteria requires that both the main ADC 12 and the auxiliary ADC 14 produce digital words at substantially the same time (i.e., synchronously) but here main ADC 12 is not enabled, the auxiliary ADC 14 must not wait any additional time and can produce digital words in its new configuration after a $6T_{SYNC}$ settling time. Thus, in this example in FIGS. 10A–10E, the auxiliary ADC 14 must wait $6T_{SYNC}$ periods before it produces its first digital word after the time $T_{CHANGE\_ADC\_14}$, as shown in FIGS. 10A–10E.

Referring now to S. 11A–11E, in this example, neither one of the ADCs 12, 14 is initially operating in a particular configuration when, at time $T_{ENABLE\_ADC\_14}$, the auxiliary ADC 14 is to be enabled. Because it takes $6T_{SYNC}$ periods after $T_{ENABLE\_ADC\_14}$ in order for the auxiliary ADC 14 to settle, and because the priority criteria requires that both the main ADC 12 and the auxiliary ADC 14 produce digital words at substantially the same time (i.e., synchronously) but here main ADC 12 is not enabled, the auxiliary ADC 14 must not wait any additional time and can produce digital words after a $6T_{SYNC}$ settling time. Thus, in this example in FIGS. 11A–11E, the auxiliary ADC 14 must wait $6T_{SYNC}$ periods before it produces its first digital word after the time $T_{ENABLE\_ADC\_14}$, as shown in FIGS. 11A–11E.

Referring now to FIGS. 12A–12E, in this example, neither one of the ADCs 12, 14 are enabled when, at time $T_{ENABLE\_ADC\_12}$, ADC 12 is enabled for a single conversion. It is first noted that it takes $6T_{SYNC}$ periods after $T_{ENABLE\_ADC\_12}$ in order for the main ADC 12 to settle. In this example, during the settle time period $T_{SETTLE}$ of main ADC 12 (FIG. 12B), auxiliary ADC 14 is to be enabled, here at time $T_{ENABLE\_ADC\_14}$. Here, $T_{ENABLE\_ADC\_14}$ occurs $2T_{SYNC}$ periods after the time $T_{ENABLE\_ADC\_12}$. It is first noted that it takes $6T_{SYNC}$ periods after $T_{ENABLE\_ADC\_14}$ in order for the auxiliary ADC 14 to settle. Further, because the priority criteria requires that both the main ADC 12 and the auxiliary ADC 14 produce digital words at substantially the same time (i.e., synchronously), and because in this example, $T_{ENABLE\_ADC\_14}$ occurred $2T_{SYNC}$ periods after the time $T_{ENABLE\_ADC\_12}$, the auxiliary ADC 14 must wait one $T_{SYNC}$ and then produces its digital word after an additional $6T_{SYNC}$ periods, as shown in FIGS. 12A–12E.

A number of embodiments of the invention have been described. Nevertheless, it will be understood that various modifications may be made without departing from the spirit and scope of the invention. For example, here the system 10 has both the main ADC 12 and the auxiliary ADC 14 on the same integrated circuit chip as the microcontroller 50. The microcontroller 50 can be used to digitally compensate the main measurement for influence of the auxiliary input and can also be used to further process the main measurement (e.g., linearization). This provides a single-chip solution for converting and processing sensor outputs. Accordingly, other embodiments are within the scope of the following claims.

What is claimed is:

1. An analog to digital conversion system, comprising:

an integrated circuit chip; and a plurality of analog to digital converters formed on the integrated circuit chip, each one of said analog to digital converters being configured to convert a corresponding one of a plurality of analog signals into a corresponding digital signal in response to pulses fed to said converter;

said plurality of analog to digital converters having a first analog to digital converter and a second analog to digital converter;

said first analog to digital converter performing an analog to digital conversion with a first degree of conversion performance;

said second analog to digital converter performing an analog to digital conversion with a second degree of conversion performance;

said first degree of conversion performance being different from said second degree of conversion performance.

2. The system recited in claim 1 wherein said plurality of analog to digital converters perform analog to digital conversions with different input signal to internal noise resolutions.

3. The system recited in claim 1 wherein said plurality of analog to digital converters perform analog to digital conversions with different conversion rates.

4. The system recited in claim 1 wherein said plurality of analog to digital converters have different input impedances.

5. The system recited in claim 1 wherein said plurality of analog to digital converters have different gains.

6. The system recited in claim 1 including a controller for changing a configuration of one or more of said plurality of analog to digital converters.

7. The system recited in claim 6 wherein the controller provides the change in configuration with a priority to one of said plurality of analog to digital converters over another one of said plurality of analog to digital converters.

8. An analog to digital conversion system, comprising:

an integrated circuit chip;

a plurality of analog to digital converters formed on the integrated circuit chip, each one of said analog to digital converters being configured to convert a corresponding one of a plurality of analog signals into a corresponding sequence of digital words; and said plurality of analog to digital converters having a first analog to digital converter and a second analog to digital converter;

said first analog to digital converter performing an analog to digital conversion with a first degree of conversion performance;

said second analog to digital converter performing an analog to digital conversion with a second degree of conversion performance;

said first degree of conversion performance being different from said second degree of conversion performance;

a source of pulses;

wherein each one of said plurality of analog to digital converters is configured to provide a corresponding one of the sequences of digital words in response to the pulses; and wherein each one of the digital words in each of the sequences is provided at substantially the same time.

9. The system recited in claim 8 wherein said plurality of analog to digital converters perform analog to digital conversions with different input signal to internal noise resolutions.

10. The system recited in claim 8 wherein said plurality of analog to digital converters have different input impedances.

11. The system recited in claim 8 wherein said plurality of analog to digital converters have different gains.

12. The system recited in claim 8 including a controller for changing a configuration of one or more of said plurality of analog to digital converters.

13. The system recited in claim 12 wherein the controller provides the change in configuration with a priority to one of said plurality of analog to digital converters over another one of said plurality of analog to digital converters.

14. An analog to digital conversion system, comprising:
an integrated circuit chip having formed thereon:
a plurality of analog to digital converters, each one of said analog to digital converters being configured to convert a corresponding one of a plurality of analog signals into a corresponding digital word in response to pulses fed to said converter, a first one of said plurality of analog to digital converters having a higher degree of performance than a second one of said plurality of analog to digital converters;
said second one of said plurality of analog to digital converters occupying less area on the chip and consuming less power than said first one of said plurality of analog to digital converters based upon said second one of said plurality of analog to digital converters having a lesser degree of performance than said first one of said plurality of analog to digital converters.

15. The system recited in claim 14 wherein said plurality of analog to digital converters have different input impedances.

16. The system recited in claim 14 wherein said plurality of analog to digital converters have different gains.

17. The system recited in claim 14 wherein each one of the digital words is produced by said plurality of analog to digital converters at substantially the same time.

18. An analog to digital conversion system, comprising:
an integrated circuit chip;
a plurality of analog to digital converters formed on the chip, each one of said analog to digital converters being configured to convert a corresponding one of a plurality of analog signals into a corresponding digital word in response to pulses fed to said converter; and
said plurality of analog to digital converters having a first analog to digital converter and a second analog to digital converter;
said first analog to digital converter performing an analog to digital conversion with a first degree of conversion performance;
said second analog to digital converter performing an analog to digital conversion with a second degree of conversion performance;
said first degree of conversion performance being different from said second degree of conversion performance;
a microcontroller formed on the chip.

19. The system recited in claim 18 wherein the microcontroller processes the digital words produced by said plurality of analog to digital converters.

20. An analog to digital conversion system, comprising:
an integrated circuit chip;
a plurality of analog to digital converters formed on the chip, each one of said analog to digital converters being configured to convert a corresponding one of a plurality of analog signals into a corresponding digital word in response to pulses fed to said converter, a first one of said plurality of analog to digital converters performing an analog to digital conversion with a higher degree of conversion performance than a second one of said plurality of analog to digital converters performing an analog to digital conversion; and
a controller for interrupting and/or changing a configuration of said plurality of analog to digital converters;
said controller providing the interrupt and/or change in configuration in accordance with a predetermined priority criteria, said predetermined priority criteria being that a change in configuration of said second one of said plurality of analog to digital converters will not interrupt said first one of said plurality of analog to digital converters and a change in configuration of said first one of said plurality of analog to digital converters causes an interrupt in both said first and second converters.

21. The system recited in claim 20 wherein the interrupt to said second one of said plurality of analog to digital converters, resulting from the change in configuration of said second one of said plurality of analog to digital converters, inhibits said second one of said plurality of analog to digital converters from converting; and
wherein the interrupt is released at a time such that said second one of said plurality of analog to digital converters produces digital words at substantially the same time as the digital words are produced by said first one of said plurality of analog to digital converters.

* * * * *